3,236,694
PRIMARY CELL WITH NON-AQUEOUS ELECTROLYTE

Vernon A. Stenger and Moushu Chao, Midland, Mich., assignors to The Dow Chemical Company, Midland, Mich., a corporation of Delaware
No Drawing. Filed Sept. 29, 1964, Ser. No. 400,239
4 Claims. (Cl. 136—100)

This is a continuation-in-part of patent application Serial No. 135,742, filed September 5, 1961, now abandoned.

This invention pertains to a primary cell having a non-aqueous electrolyte. More particularly this invention pertains to a cell containing an electrolyte comprising bromine and cesium bromide.

Bromine has potential interest as an active liquid for use in certain types of batteries or primary cells, including fuel cells. However, it has a very low electrical conductivity. Others have reported that solutions of tetra-n-butylammonium bromide or trimethylammonium chloride in bromine are capable of conducting electricity. These systems, however, are susceptible to side reactions such as bromination of the organic solute or splitting off of alkyl bromide. Bromination produces hydrogen bromide which is objectionable in an electrolytic system.

It is therefore an object of this invention to provide a primary cell having a non-aqueous electrolyte. A further object is to provide an electrolyte in which bromine is the solvent.

The above and other objects are obtained according to the invention by providing an electrolyte comprising cesium bromide in liquid bromine. Upon the dissolution of cesium bromide in liquid bromine a brown liquid is obtained having a specific gravity in the range of 3.1 to 3.4 at 25 degrees centigrade and having a high conductance. This electrolyte may be used in batteries or cells where it is desirable to have the bromine as the active constituent. The electrolyte may be used with any pair of dissimilar electrodes which are compatible with dry liquid bromine. Examples of suitable electrode materials include magnesium, sodium, lead, cadmium, zinc, tantalum, platinum, graphite, tungsten, and like materials. The electrolyte can be employed at temperatures from the freezing point of the mixture which will be as low or lower than minus 7 degrees centigrade, the melting point of bromine, to 58 degrees centigrade, the boiling point of bromine at atmospheric pressure. Higher temperatures can be used if the electrolytic cell is operated under pressure. The critical pressure of bromine (approximately 100 atmospheres) would be an upper limit to the operating pressure.

Only a small amount of cesium bromide has to be dissolved in the bromine to provide solutions of high electrical conductivity. As low as 0.5 gram of cesium bromide per hundred grams of bromine may be used. The maximum amount of cesium bromide to be employed is not critical as excellent conductivity is achieved when the bromine is saturated with the cesium bromide. Generally from 1 to 23 grams of cesium bromide per 100 grams of bromine are employed, but preferably the cesium bromide content is from 4 to 15 grams per 100 grams of bromine.

To further illustrate the invention, conductivity measurements were made on solutions of cesium bromide in liquid anhydrous bromine at various concentrations using conductivity cells of either one of the two following type. For solutions in the conductivity region with specific conductance smaller than about $10^{-3}$ mhos per cm., the cell consisted of a cylindrical glass container and two tantalum foil electrodes, each about one centimeter on a side, placed about 0.8 centimeter apart. For solutions in the conductivity region with specific conductance greater than about $10^{-3}$, the cell consisted of an H-shaped glass container into whose vertical limbs two tantalum foil electrodes each 0.8 centimeter on a side and placed 13 centimeters apart, were inserted. The cell constants for the two cells, as calibrated with 0.01 normal aqueous solution of potassium chloride, were found to be 0.272 and 13.75, respectively. The cell was immersed in an oil bath kept at 25 degrees centigrade. All data were obtained with an alternating current conductivity bridge at audio frequencies of 500, 1000, 2000, 4000, and 8000 cycles per second. The final data were obtained by extrapolation to infinite frequency so that error due to polarization was eliminated. Although tantalum electrodes were used in most cases, it was found that other metal foils such as bright or platinized platinum and tungsten of similar geometric configuration gave results essentially the same as those with tantalum foil.

The results of these studies carried out on a number of solutions of different concentrations are summarized in Table I which follows.

TABLE I

| Grams of CsBr per 100 Grams of $Br_2$ | Specific Conductance mhos/cm. | Equivalent Conductance |
|---|---|---|
| 0 | $1.9 \times 10^{-10}$ | |
| 0.452 | $8.27 \times 10^{-7}$ | $1.32 \times 10^{-2}$ |
| 0.751 | $9.98 \times 10^{-6}$ | $9.57 \times 10^{-2}$ |
| 1.06 | $3.91 \times 10^{-5}$ | $2.64 \times 10^{-1}$ |
| 1.37 | $8.35 \times 10^{-5}$ | $4.39 \times 10^{-1}$ |
| 2.05 | $7.37 \times 10^{-5}$ | $2.59 \times 10^{-1}$ |
| 2.27 | $7.65 \times 10^{-5}$ | $2.43 \times 10^{-1}$ |
| 2.68 | $7.32 \times 10^{-5}$ | $1.98 \times 10^{-1}$ |
| 3.54 | $8.37 \times 10^{-5}$ | $1.71 \times 10^{-1}$ |
| 3.99 | $2.86 \times 10^{-4}$ | $5.19 \times 10^{-1}$ |
| 4.34 | $4.25 \times 10^{-3}$ | 7.07 |
| 5.05 | $6.07 \times 10^{-3}$ | 8.52 |
| 6.12 | $1.06 \times 10^{-2}$ | 12.5 |
| 6.73 | $1.31 \times 10^{-2}$ | 14.8 |
| 7.40 | $1.74 \times 10^{-2}$ | 16.0 |
| 11.49 | $1.76 \times 10^{-2}$ | 15.9 |
| 12.95 | $2.37 \times 10^{-2}$ | 18.0 |
| 15.02 | $4.86 \times 10^{-2}$ | 23.3 |

A primary cell was constructed having two dissimilar electrodes, one a tungsten rod 0.3 centimeter in diameter and the other a magnesium rod 0.5 centimeter in diameter. The electrodes were fitted through a polyethylene bottle cap so as to space them about one centimeter apart. Electrical connection was made between the electrodes through a microammeter in series with a 22,000 ohm resistance. An electrolyte solution was prepared by saturating liquid bromine with cesium bromide. The solution was poured into a weighing bottle and the electrodes were immersed therein. A current of about 90 microamperes at a potential of 1.85 volts was maintained substantially constant for a period of two days.

In substantially the same manner, primary cells may be produced employing a pair of dissimilar electrodes of any two materials selected from magnesium, sodium, lead, cadmium, zinc, tantalum, platinum, graphite, or tungsten.

Various modifications may be made in the present invention without departing from the spirit or scope thereof, and it is to be understood that we limit ourselves only as defined in the appended claims.

We claim:
1. A primary cell comprising a pair of dissimilar electrodes of materials selected from the group consisting of magnesium, sodium, lead, cadmium, zinc, tantalum, platinum, graphite and tungsten in contact with a non-aqueous electrolyte consisting essentially of from about 0.5 gram to a saturating amount of cesium bromide per 100 grams of bromine dissolved in liquid anhydrous bromine.

2. A primary cell comprising a pair of dissimilar electrodes of materials selected from the group consisting of magnesium, sodium, lead, cadmium, zinc, tantalum, platinum, graphite and tungsten in contact with a non-aqueous electrolyte consisting essentially of a solution of cesium bromide in liquid anhydrous bromine, wherein said cesium bromide is in a concentration of from about 4 to about 15 grams per 100 grams of said liquid anhydrous bromine.

3. A primary cell comprising a pair of dissimilar electrodes of materials selected from the group consisting of magnesium, sodium, lead, cadmium, zinc, tantalum, platinum, graphite, and tungsten in contact with a non-aqueous electrolyte consisting essentially of a solution of cesium bromide in liquid anhydrous bromine, said cesium bromide ranging in concentration from about 1 to about 23 grams per 100 grams of said bromine.

4. A primary cell comprising electrodes of magnesium and tungsten in contact with a non-aqueous solution consisting essentially of cesium bromide in liquid anhydrous bromine, said non-aqueous solution being further characterized in that it contains a saturating amount of cesium bromide per 100 grams of said liquid anhydrous bromine.

References Cited by the Examiner
UNITED STATES PATENTS 3,057,760  10/1962  Dereska et al. _____ 136—90 X
3,134,698   5/1964  Neipert et al. _____ 136—136 X

OTHER REFERENCES

Chemical Abstracts, vol. 45, col. 5049, April–June 1961.

WINSTON A. DOUGLAS, *Primary Examiner.*

JOHN H. MACK, *Examiner.*